United States Patent [19]

Matsuda et al.

[11] 4,156,899
[45] May 29, 1979

[54] CURRENT SOURCE INVERTER

[75] Inventors: Yasuo Matsuda; Takeo Maeda; Takuji Matsumura, all of Hitachi, Japan

[73] Assignee: Hitachi, Ltd., Japan

[21] Appl. No.: 800,533

[22] Filed: May 25, 1977

[30] Foreign Application Priority Data

Jun. 2, 1976 [JP] Japan .................. 51-63494

[51] Int. Cl.² .......................... H02M 7/515
[52] U.S. Cl. .................................. 363/138
[58] Field of Search ............ 363/87, 95, 96, 129, 363/135–138

[56] References Cited

FOREIGN PATENT DOCUMENTS 34888 10/1967 Japan ......................... 363/138
264528 6/1970 U.S.S.R. ...................... 363/138

*Primary Examiner*—William M. Shoop
*Attorney, Agent, or Firm*—Craig & Antonelli

[57] ABSTRACT

A current source inverter circuit having a plurality of branches, each branch consisting of a pair of thyristors adapted to be switched on alternatingly for power supply from a D. C. power source and diodes connected in series to the thyristors. To each connection point between a thyristor and a diode, there is connected one end of one of a plurality of commutating capacitors, while the other ends of the capacitors are connected in common. An auxiliary charging source is provided between the common connection of the commutating capacitors and one of the terminals of the D. C. source for performing an auxiliary charging for each commutating capacitor through a respective thyristor. Between one of the terminals of the D. C. power source and the common connection of the commutating capacitors, a series circuit consisting of a diode and an auxiliary D. C. source is provided constituting a by-pass for the charging voltage of the commutating capacitor when the associated thyristor is in the ON state.

18 Claims, 11 Drawing Figures

CURRENT SOURCE INVERTER

BACKGROUND OF THE INVENTION

The present invention relates to a current source inverter circuit and, more particularly, to a current source inverter circuit of the type suitable for driving an A.C. motor.

Inverters basically to convert a D.C. current to an A.C. current, and are advantageously used for driving A.C. motors at variable speeds because of their variable output frequencies. In driving an A.C. motor with an inverter, it is strictly required to maintain the ratio of voltage to frequency almost constant. For this reason, in general, the inverter for driving an A.C. motor is used in combination with a D.C. source, as a current source inverter circuit.

A typical inverter circuit of this kind is shown in U.S. Pat. No. 3,336,520 in which the inverter is comprised of branches each of which is provided with a pair of thyristors adapted to generate an A.C. output at an intermediate point and diodes provided at the intermediate points, as well as a commutating capacitor provided between the connecting points of the thyristors and the diode in each branch. In this type of inverter, however, the commutating capacitor has not been charged at the time of starting the motor. Therefore, the commutation may be disturbed resulting in a commutating failure.

In order to avoid this failure, attempts have been made to charge the capacitor by temporarily increasing the output frequency at the time of the starting operation, or to enable the current to be commutated by restraining the rising of the output current. However, such attempts inconveniently necessitate complicated controls or prolonged starting time of the motor.

Another solution employing an auxiliary charging circuit for charging the commutating capacitor in the prior art device at the time of starting has been found also to be unacceptable due to the greatly increased complexity of the circuitry involved. This solution is based on the provision of a capacitor between respective adjacent branches.

On the other hand, another problem inherent in the current source inverter circuit is that the over-charging of the capacitor must be strictly avoided especially during a quick start, abrupt deceleration or acceleration, or an abrupt reversing of the motor, as well as in a starting of the motor with a heavy load. In general, the commutating capacitors are designed to have a small capacity, in order to avoid unstable operation with a light load. However, this requirement is quite incompatible with the above-mentioned prohibition against over-charging of the capacitor.

Thus, due to the contradictory requirements of protecting the thyristors and stabilizing the running of the motor, it is a critical problem to determine how best to control the over voltage to the capacitor.

Recent demands requiring a higher response for quick start and abrupt acceleration/deceleration for electric motors driven by current source inverter circuits requires an inverter circuit of a simplified structure which is capable of performing the double functions of preserving the starting inverting voltage for the commutating capacitor as well as prevention of over-voltage in cases of overloads.

SUMMARY OF THE INVENTION

It is therefore an object of the invention to provide a current source inverter circuit having a simplified structure which is capable of performing a satisfactory inverting function.

It is another object of the invention to provide a current source inverter circuit in which the commutating capacitors are protected against over-voltage.

According to the invention, there is provided a current source inverter circuit having a D.C. source, a plurality of branches arranged in parallel between the terminals of the D.C. source, at least one pair of controlled rectifying elements equipped with main controlling electrodes adapted to be switched on alternatingly to produce an A.C. output at an intermediate point therebetween, serial rectifying elements connected in series between respective controlled rectifying elements and their output points, and commutating capacitors connected at one end thereof to connecting points of the controlled rectifying elements and the serial rectifying elements and at the other ends thereof in common to the other ends of the commutating capacitors in other branches. This construction allows the use of capacitors having a small withstand voltage value, thus contributing to reduced cost of manufacture.

In other aspects of the invention, the inverter circuit is characterized in that a serial circuit consisting of an auxiliary D.C. source and an auxiliary controlled rectifying element, or a series circuit consisting of an auxiliary D.C. source, an auxiliary rectifying element and an impedance element, is provided between one terminal of the D.C. source and the common connection of the commutating capacitors. For an auxiliary charging of the commutating capacitors, a series circuit consisting of an auxiliary D.C. source and an auxiliary rectifying element is connected between the common connection of the commutating capacitors and one terminal of the D.C. source in a by-passing direction with respect to the polarity of the charging voltage for the commutating capacitor at the time of conduction of the main controlled rectifying element, thereby to protect the commutating capacitors from over-voltage. Also, an auxiliary rectifying element or a series circuit consisting of an auxiliary rectifying element and an auxiliary D.C. source may be connected in parallel with each commutating capacitor, in the by-passing direction with respect to the charging voltage polarity during conduction of the main controlled rectifying element.

These and other objects, features, and advantages of the present invention will become more apparent from the following detailed description when taken in conjunction with the accompanying drawings.

DESCRIPTION OF THE PREFERRED EMBODIMENTS

For an easier understanding of the present invention, a typical conventional inverter circuit will be explained with specific reference to FIG. 1.

Figure 1:
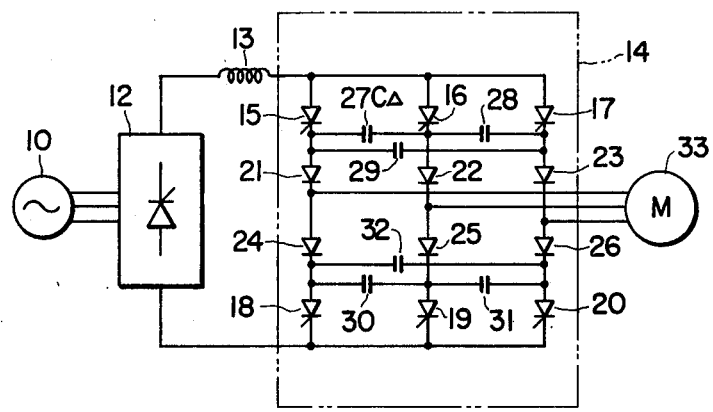
FIG. 1 is a schematic circuit diagram of a conventional current source inverter circuit.

Referring to FIG. 1, an A.C. power source 10 is connected to a converter 12, which serves to convert the A.C. voltage to a D.C. voltage. Thus, the voltage source 10 and converter 12 may be replaced by any D.C. source of suitable voltage value. The D.C. current provided by the converter 12 is delivered to an inverter 14 through a D.C. reactor 13.

The inverter 14 has three branches each of which includes a pair of thyristors 15, 18, 16, 19, 17, 20. Diodes, 21, 22, 23, 24, 25 and 26 are arranged in the illustrated manner between the thyristors of respective pairs. Commutating capacitors 27, 28, 29, 30, 31 and 32 are also connected between corresponding connecting points of the thyristors and the diodes of each branch. These commutating capacitors 27, 28, 29 and 30, 31, 32 are connected in delta configuration with respect to the respective branches. The intermediate points of each pair of diodes in each branch constitute A.C. output terminals to supply power to an electric motor 33 connected thereto.

In this construction, as the thyristors 15 to 20 are turned on in sequence, the inverter 14 outputs A.C. power to drive the motor 33. However, there is a problem in that the starting of the motor is impossible, if the commutating capacitors 27 to 32 are not charged at the time of starting. In addition, since the commutating capacitors 27 to 32 are connected in delta configuration to respective branches, they must have a large withstand voltage.

A complicated circuit structure is required for precharging the commutating capacitors in the circuit of FIG. 1. At the same time, there is a fear that the capacitors may be over-charged when the motor 33 is abruptly accelerated or decelerated. Therefore, the main purpose of the present invention is to provide solutions to these problems.

Figure 2:
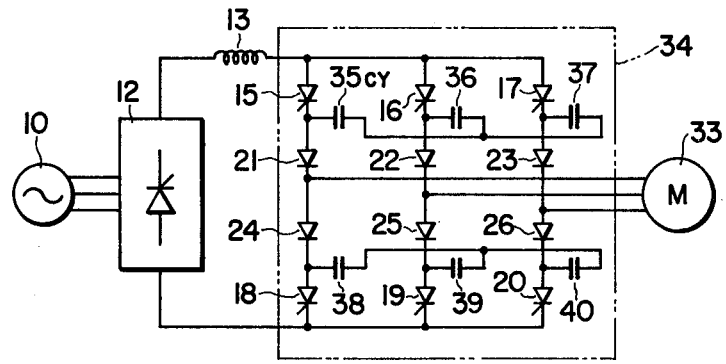
FIG. 2 is a schematic circuit diagram of a current source inverter circuit embodying the present invention.

Referring now to FIG. 2 showing an embodiment of the present invention, in which the same numerals denote the same or equivalent elements in FIG. 1, an inverter circuit 34 includes a plurality of commutating capacitors 35, 36, 37 and 38, 39, 40. One respective end of said commutating capacitors is connected to the respective connecting points of the thyristors 15 to 20 and the diodes 21 to 26, while the other ends thereof are connected in common, i.e., with each other. Thus, the capacitors 35, 36, 37 and 38, 39, 40 are connected to the branches of the inverter in star configuration. This circuit differs from that of the prior art, as shown in FIG. 1, only in that the commutating capacitors 35, 36, 37 and the commutating capacitors 38, 39, 40 are connected in star configuration to operate in series.

Figure 3:
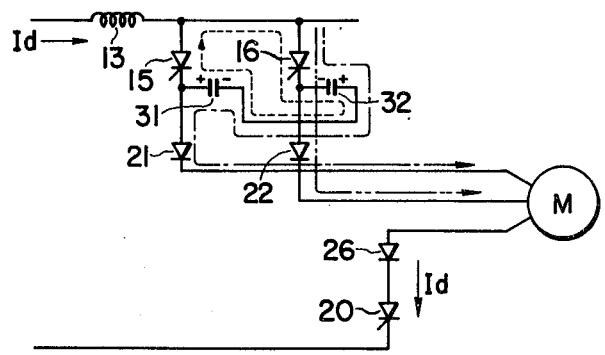
FIG. 3 is a partial circuit diagram for explaining the operation of the inverter of FIG. 2.

Referring to FIG. 3, showing the manner of operation of the embodiment of FIG. 2, it is illustrated therein the manner in which a commutation is made from the thyristor 15 to the thyristor 16 when the thyristors 15 and 20 are in the ON state. The commutating capacitors 31, 32 have been charged up to a predetermined state just before the commutation, in the illustrated polarity. As the thyristor 16 is turned on, a current shown by the broken line is caused to flow by the commutating capacitors 31, 32 so that the thyristor 15 is turned off. Then, the load current takes the path as shown by the one-dot-and-dash line. After a duplicate commutating period in which the diode 22 is on, the current moves to the path shown by the two-dots-and-dash line, thereby to complete the commutation.

Figure 4A:
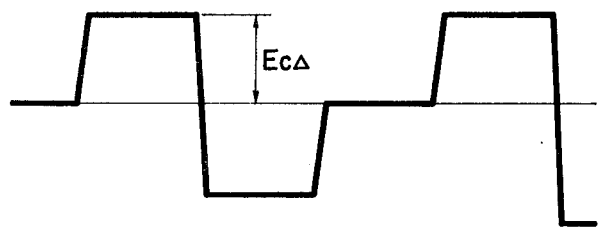
FIGS. 4a and 4b are waveform diagrams concerning the commutating capacitors in the circuits of FIGS. 1 and 2.
Figure 4B:
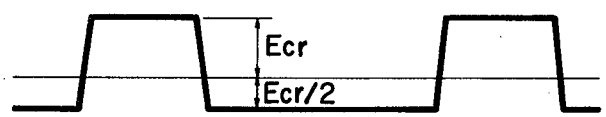

Referring to FIGS. 4a and 4b showing the voltage waveform at a commutating capacitor for each of the circuits of FIGS. 1 and 2, respectively, the capacitance of the capacitor contributing to the commutation is 3C Δ/in the circuit of FIG. 1, while, in the circuit of FIG. 2, the capacitance is Cr/2, where CΔ and Cr represent, respectively, capacitances of the capacitors 27 to 32 and the capacitors 35 to 40.

As will be seen from FIGS. 4a and 4b, the commutating voltages are EcΔ and 3Ecr/2, respectively, for the circuits of FIGS. 1 and 2. Therefore, for the same commutating voltage, the capacitors of the circuit of FIG. 2 must have a capacitance triple that of the capacitors of the circuit of FIG. 1.

Namely, $Ecr = 2Ec\ \Delta/3$     (1)
$Cr = 3C\Delta$  (2)

Representing the capacitances of the capacitors by PcΔ and Pcr, respectively, the following relationships are obtained:

$$Pc\Delta = \frac{1}{2} C\Delta \left( \sqrt{\frac{2}{3}}\ Ec\Delta \right)^2 \quad (3)$$

$$Pcr = \frac{1}{2} Cr \left( \frac{1}{\sqrt{2}}\ Ecr \right)^2 \quad (4)$$

from the equations (1), (2), (3) and (4), it can be determined that $Pc\Delta = Pcr.$ Thus, the capacitances of the commutating capacitors of FIG. 1 and FIG. 2 are the same. However, it is to be noted, that the capacitors of the circuit of FIG. 2 must have a withstand voltage which is only ⅔ of that of the capacitors or FIG. 1. The withstand voltage is determined by the nature of the material, so that the capacitor of a larger withstand voltage is more expensive, even when the capacitances are the same. Therefore, the inverter circuit having Y-connected commutating capacitors, which constitute the basic form of the invention, are advantageous also from the economical point of view.

Figure 5:
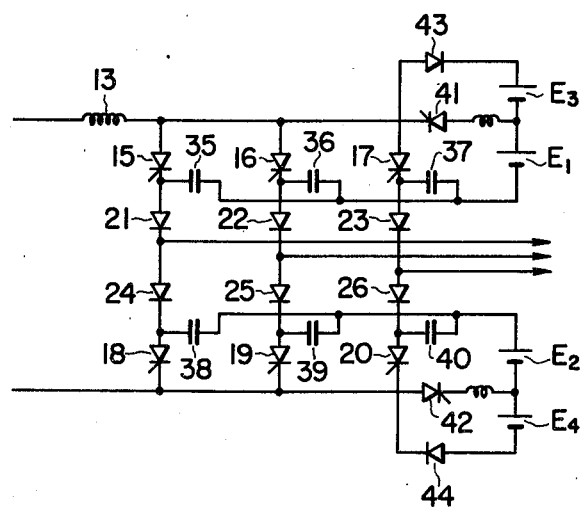
FIG. 5 is a schematic circuit diagram of a current source inverter circuit which is another embodiment of the invention.

Referring to FIG. 5, showing another embodiment of the invention, an auxiliary charging circuit and an over-voltage clamping circuit are provided in the circuit of FIG. 2. The auxiliary charging circuit consists of a series circuit having an auxiliary charging thyristor 41 or 42 and an auxiliary charging source E1, E2 which is connected between the neutral point of the Y-connected commutating capacitors and the D.C. terminal of the inverter, in the manner shown in the drawing.

The over-voltage clamping circuit consists of a series circuit having a clamp diode 43 or 44 and a D.C. source E3 or E4, which is connected between the auxiliary charging source E1 or E2 and respective terminals, in the manner illustrated. In this arrangement, the series source E1 and E3 or E2 and E4 acts as an over-voltage clamping source.

Figure 6:
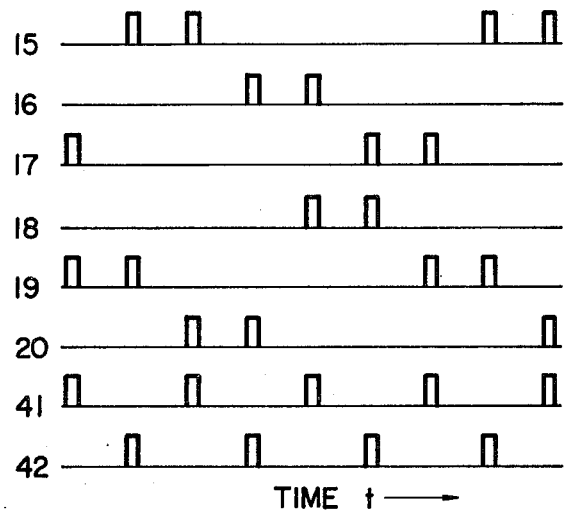
FIG. 6 is a waveform diagram of a gate pulse of a thyristor of the circuit of FIG. 5.

FIG. 6 shows an example of a time chart of the gate pulses of the thyristors 15 to 20 and 41, 42 in the circuit of FIG. 5. The timing for the auxiliary charging is selected to be -60° behind the turning on time of the main thyrsitor. This is to utilize the gate pulse of the opposite thyristor, and the auxiliary charging can be made at any time excepting the period of commutation.

In operation, when thyristors 15 to 17 or 18 to 20 are turned on, it is possible to charge the capacitors 35 to 40, through turning on of the thyristors 41 or 42. Therefore, the capacitors are well charged to ensure the commutating motion of the thyristors 15 to 17 and 18 to 20, avoiding a commutating failure at the time of the starting of the motor.

Thanks to the provision of the over-voltage clamp circuit for preventing the over-charging of the commutating capacitors 35 to 40, the clamp diode 43 or 44 is turned on to prevent the commutating capacitors 35 to 40 from being over-charged, when the voltage applied to these capacitors exceeds the voltage given by the sources E1 and E3 or E2 and E4. This provides a satisfactory clamping with less expensive construction. However, it is, of course, possible to provide a specific clamping voltage source.

Figure 7:
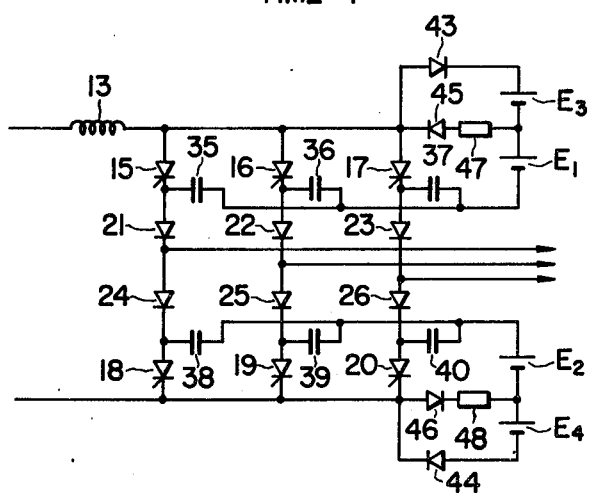
FIGS. 7 and 10 are schematic diagrams of inverter circuits constituting different embodiments of the invention.

Referring to FIG. 7, still another embodiment of this invention is shown therein which differs from that of FIG. 5 in that diodes 45, 46 are provided as auxiliary charging elements, and that impedances 47, 48 of a relatively large value of impedance are provided. This structure is much simplified, because no auxiliary charging thyristor is required. The auxiliary charging impedances 47, 48 are adapted to reduce the auxiliary charging current, so as to prevent the commutating operation from being affected by the commencement of the auxiliary charging concurrent with the turning on of the thyristors 15 to 20.

In the circuits of FIGS. 5 and 7, the voltage on the commutating capacitor in the same direction with the auxiliary charging voltage is fixed to be the same with the latter in the usual state. Therefore, the increase of the commutating voltage due to the increase of frequency or load current causes the inter-peak voltage of the commutating capacitor to increase. This increase of the voltage in the reverse direction to the auxiliary charging voltage must be restrained, especially when the capacitance of the capacitor is selected to be small for stabilizing the running of the motor.

Figure 8:
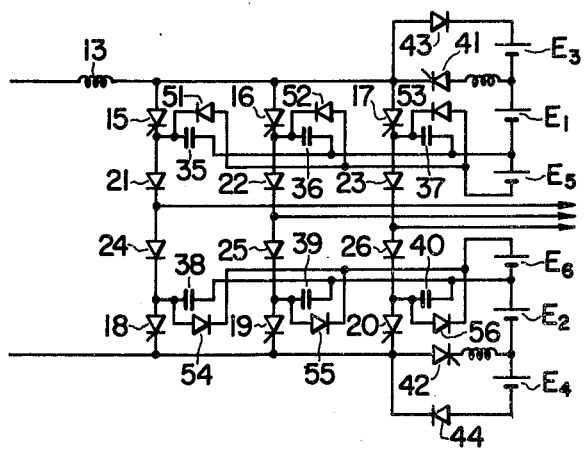

FIG. 8 shows an inverter circuit which has added an over-voltage clamping circuit to the circuit of FIG. 5 for protection against the above-stated voltage increase in the reverse direction. In FIG. 8, numerals E5 and E6 denote clamping voltage sources which operate against an over-voltage in the reverse direction, while numerals 51 to 56 denote clamping diodes for this purpose.

In the circuit of FIG. 8, the over-voltage to the commutating capacitors 35 to 37 cannot go higher than the sum of E1 and E3 in the direction of the auxiliary charging voltage, and cannot exceed E5 in the reverse direction, so that the thyristors and so on are perfectly protected. The D.C. sources E3 and E4 in this arrangement may be of zero voltage.

Figure 9:
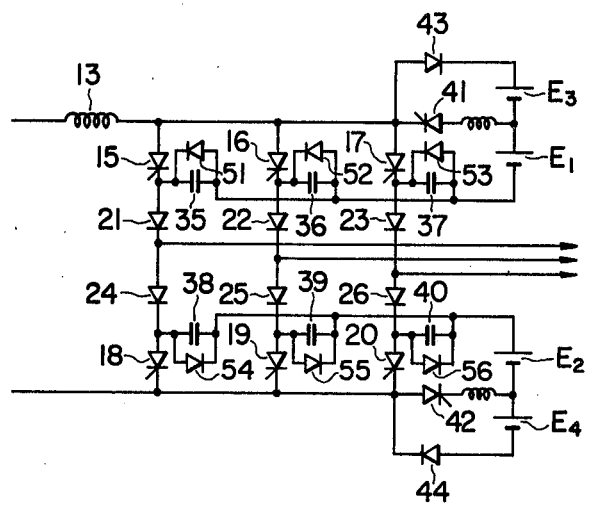

FIG. 9 shows an arrangement in which the over-voltage clamping voltage sources E5, E6 designed to operate in the reverse direction are at zero volts. In this case, the commutating capacitors may be of D.C. withstand voltage. It will be clear to those skilled in the art that the clamping circuits for protection in the reverse direction provided as shown in FIGS. 8 and 9 are equally applicable to the circuit of FIG. 7.

As has been described, according to the invention, a current source inverter circuit is provided which can ensure the commutating function at the starting time by a simple structure and can prevent an over-voltage to the commutating capacitors during an overload operation. Therefore, a quick start, abrupt acceleration/deceleration and a heavy load operation can be performed easily avoiding the fear of damaging the system.

In addition, since the capacitance of the commutating capacitors can be determined by a commutating condition, irrespective of the over-voltage condition of the capacitors, the capacitance can be reduced to ensure a stable operation of the motor during light load operation.

Figure 10:
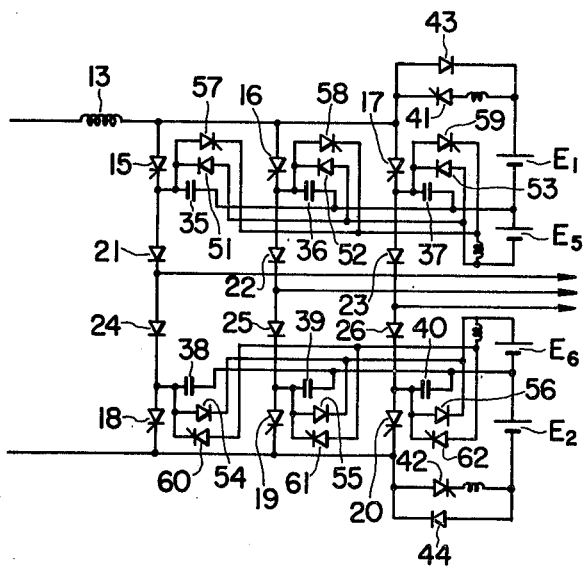

In general, the auxiliary charging is not necessary once the motor has been started, although the establishment of the commutating capability is indispensable. Therefore, the inverter circuit of FIGS. 8 or 10 are practically satisfactory. However, for wider use of the inverter, an extremely low frequency range may require a constant auxiliary charge even after the starting.

As mentioned before, the commutating voltage in the inverter having Y-connected commutating capacitors is the inter-peak voltage between positive and negative, so that the auxiliary charging circuit must be prepared for both directions of the voltage, in order to maintain the constant auxiliary charging.

FIG. 10 shows an example of an inverter provided with auxiliary charging means for both directions. This circuit is to use the over-voltage clamping sources E5 and E6 of FIG. 8 also for the auxiliary charging source in the reverse direction, with the thyristors 57 to 62 performing the auxiliary charging. Thus, this circuit can maintain a commutating voltage determined by the auxiliary charging source voltage, and therefore, is suitable for the use in which a constant auxiliary charging.

As has been described, the present invention provides a current source inverter having a simplified structure and capable of performing a good commutating operation.

While we have shown and described several embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to a person of ordinary skill in the art.

What is claimed is:

1. A current source inverter circuit comprising: a DC source, a plurality of parallel branch circuits connected between the terminals of said DC source, each branch circuit including at least one pair of main controlled rectifying elements connected in series, said elements producing an AC output at an intermediate point of the pair, series rectifying elements provided in series between said intermediate point for AC output and said main controlled rectifying elements in each branch circuit, and a plurality of commutating capacitors having one end thereof connected to the point in the respective branches at which said main controlled rectifying elements and said series rectifying elements are connected, said commutating capacitors having the other ends thereof connected in common to the other ends of said commutating capacitors connected to corresponding points in other branches; and a first series circuit consisting of a first auxiliary DC source and a first auxiliary controlled rectifying element connected between the common connection of said commutating capacitors and one of the terminals of said DC source for charging said commutating capacitors.

2. An inverter circuit as claimed in claim 1, further comprising a second series circuit consisting of a second auxiliary D.C. voltage source and a first auxiliary rectifying element connected between the common connection of said commutating capacitors and one of the terminals of said D.C. source in such a direction as to provide a by-pass with respect to the charging polarity of said commutating capacitors when said main controlled rectifying element is conducting.

3. An inverter circuit as claimed in claim 2, wherein said first and second auxiliary D.C. sources use at least portions thereof commonly.

4. An inverter circuit as claimed in claim 2, further comprising a third series circuit consisting of a plurality of second auxiliary rectifying elements having one end thereof connected in common to a third auxiliary D.C. voltage source connected to the common connection of said commutating capacitors, said second auxiliary rectifying elements being connected in parallel with a commutating capacitor in such a direction as to provide a by-pass for a polarity reverse to the discharge voltage polarity at the time when said main controlled rectifying element is conducting.

5. An inverter circuit as claimed in claim 1, further comprising a first auxiliary rectifying element connected between the common connection of said commutating capacitors and one of the terminals of said D.C. source in such a direction as to provide a by-pass with respect to the charging polarity of said commutating capacitors when said main controlled rectifying element is conducting.

6. An inverter circuit as claimed in claim 5, further comprising a series circuit consisting of a plurality of third auxiliary rectifying elements having one end thereof connected in common to an impedance element connected to the common connection of said commutating capacitors, said third auxiliary rectifying elements being disposed in reverse parallel relation with each of said second auxiliary rectifying elements.

7. An inverter circuit as claimed in claim 2, further comprising a plurality of second rectifying elements connected in parallel with a respective commutating capacitor for providing a by-pass for a polarity reverse to the charging voltage polarity when said main controlled rectifying element is conducting.

8. A current source inverter circuit comprising:

a DC source, a plurality of parallel branch circuits connected between the terminals of said DC source, each branch circuit including at least one pair of main controlled rectifying elements connected in series, said elements producing an AC output at an intermediate point of the pair, series rectifying elements provided in series between said intermediate point for AC output and said main controlled rectifying elements in each branch circuit, and a plurality of commutating capacitors having one end thereof connected to the point in the respective branches at which said main controlled rectifying elements and said series rectifying elements are connected, said commutating capacitors having the other ends thereof connected in common to the other ends of said commutating capacitors connected to corresponding points in other branches; and a first series circuit consisting of a first auxiliary DC voltage source, a further auxiliary rectifying element and an impedance element connected between the common connection of said commutating capacitors and one of the terminals of said DC source in such a direction as to provide a charge to each commutating capacitor.

9. An inverter circuit as claimed in claim 8, further comprising a second series circuit consisting of a second auxiliary D.C. voltage source and a first auxiliary rectifying element connected between the common connection of said commutating capacitors and one of the terminals of said D.C. source in such a direction as to provide a by-pass for the charging voltage polarity when said main controlled rectifying element is conducting.

10. An inverter as claimed in claim 9, wherein said first and second auxiliary D.C. voltage sources use at least portions thereof commonly.

11. An inverter circuit as claimed in claim 9, further comprising a third series circuit consisting of a plurality of second auxiliary rectifying elements having one end thereof connected in common to a third auxiliary D.C. voltage source connected to the common connection of said commutating capacitors, said second auxiliary rectifying elements being connected in parallel with a respective commutating capacitor in such a direction as to provide a by-pass for a polarity reverse to the discharge voltage polarity at the time when said main controlled rectifying element is conducting.

12. An inverter circuit as claimed in claim 8, further comprising a first auxiliary rectifying element connected between the common connection of said commutating capacitors and one of the terminals of said D.C. source in such a direction as to provide a by-pass with respect to the charging polarity of said commutating capacitors when said main controlled rectifying element is conducting.

13. An inverter circuit as claimed in claim 12, further comprising a series circuit consisting of a plurality of third auxiliary rectifying elements having one end thereof connected in common to an impedance element connected to the common connection of said commutating capacitors, said third auxiliary rectifying elements being disposed in reverse parallel relation with each of said second auxiliary rectifying elements.

14. An inverter circuit as claimed in claim 9, further comprising a plurality of second rectifying elements connected in parallel with a respective commutating capacitor for providing a by-pass for a polarity reverse to the charging voltage polarity when said main controlled rectifying element is conducting.

15. A current source inverter circuit comprising:

a DC source, a plurality of parallel branch circuits connected between the terminals of said DC source, each branch circuit including at least one pair of main controlled rectifying elements connected in series, said elements producing an AC output at an intermediate point of the pair, series rectifying elements provided in series between said intermediate point for AC output and said main controlled rectifying elements in each branch circuit, and a plurality of commutating capacitors having one end thereof connected to the point in the respective branches at which said main controlled rectifying elements and said series rectifying elements are connected, said commutating capacitors having the other ends thereof connected in common to the other ends of said commutating capacitors connected to corresponding points in other branches; and a series circuit consisting of a second auxiliary DC voltage source and a first auxiliary rectifying element connected between the common connection of said commutating capacitors and one of the terminals of said DC source in such a direction as to provide a by-pass for the charging voltage polarity for said commutating capacitors when said main controlled rectifying element is conducting.

16. A current source inverter circuit comprising:
a DC source, a plurality of parallel branch circuits connected between the terminals of said DC source, each branch circuit including at least one pair of main controlled rectifying elements connected in series, said elements producing an AC output at an intermediate point of the pair, series rectifying elements provided in series between said intermediate point for AC output and said main controlled rectifying elements in each branch circuit, and a plurality of commutating capacitors having one end thereof connected to the point in the respective branches at which said main controlled rectifying elements and said series rectifying elements are connected, said commutating capacitors having the other ends thereof connected in common to the other ends of said commutating capacitors connected to corresponding points in other branches; and charging means including an auxiliary DC source for charging said commutating capacitors.

17. An inverter circuit as claimed in claim 16, further comprising a first by-pass means connected to said commutating capacitors for providing a by-pass with respect to the charging polarity of said commutating capacitors when said main controlled rectifying element is conducting.

18. An inverter circuit as claimed in claim 17, further comprising second by-pass means connected to said by-pass capacitors for providing a by-pass for a polarity reverse to the discharge voltage polarity at the time said main controlled rectifying element is conducting.

* * * * *